US011458796B2

(12) United States Patent
Edren et al.

(10) Patent No.: US 11,458,796 B2
(45) Date of Patent: Oct. 4, 2022

(54) CONTROLLING VEHICLE SUSPENSION SYSTEM USING PRESSURE SET POINT

(71) Applicant: Zoox, Inc., Foster City, CA (US)

(72) Inventors: Johannes Edren, Belmont, CA (US); Ahditya Melkote, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 206 days.

(21) Appl. No.: 16/140,002

(22) Filed: Sep. 24, 2018

(65) Prior Publication Data
US 2020/0094645 A1 Mar. 26, 2020

(51) Int. Cl.
B60G 17/052 (2006.01)
B60G 17/015 (2006.01)
(Continued)

(52) U.S. Cl.
CPC ..... B60G 17/0525 (2013.01); B60G 17/0155 (2013.01); B60W 10/22 (2013.01);
(Continued)

(58) Field of Classification Search
CPC ............ B60G 17/0525; B60G 17/0155; B60G 2600/20; B60G 13/10; B60G 17/0416; B60G 2202/152; B60G 11/26; B60G 17/0165; B60G 17/0162; B60G 17/052; B60G 17/016; B60G 2401/176; B60G 2401/174; B60G 2400/842; B60G 2400/843; B60G 2400/847; B60G 2401/16; B60G 2401/142; B60G 2400/90; B60G 2400/51222; B60G 2400/252; B60G 2400/60; B60G 2400/63; B60G 2500/30; B60G 11/27; B60W 10/22
See application file for complete search history.

(56) References Cited

U.S. PATENT DOCUMENTS 4,722,548 A 2/1988 Hamilton et al.
5,825,284 A 10/1998 Dunwoody
(Continued)

FOREIGN PATENT DOCUMENTS

CN 204184159 U 3/2015
DE 102010032046 A1 * 1/2012 ............ B60G 17/04
(Continued)

OTHER PUBLICATIONS

Basic Principles of Air Springs, Naimi et al., Jan. 2014 Engineering Direct (Year: 2014).*
(Continued)

Primary Examiner — Navid Z. Mehdizadeh
(74) Attorney, Agent, or Firm — Lee & Hayes, P.C.

(57) ABSTRACT

A suspension system may include a pneumatic spring at each wheel of a vehicle. The suspension system may be configured to determine and achieve a pressure set point in each of the pneumatic springs and a target ride height at each wheel of the vehicle. The pressure set point may be determined based on a load at each of the wheels and the center of gravity of the vehicle, such that upon reaching the pressure set point at each in each of the pneumatic springs, a target load and target ride height may be achieved at each of the wheels of the vehicle. The system may also be used to level the ride height of the vehicle and/or achieve a desired orientation.

20 Claims, 8 Drawing Sheets

(51) Int. Cl.
  *B60W 10/22* (2006.01)
  *B60G 13/10* (2006.01)
  *B60G 17/04* (2006.01)
  *B60G 11/26* (2006.01)
(52) U.S. Cl.
  CPC .............. *B60G 11/26* (2013.01); *B60G 13/10* (2013.01); *B60G 17/0416* (2013.01); *B60G 2202/152* (2013.01); *B60G 2600/20* (2013.01)

(56) References Cited

U.S. PATENT DOCUMENTS

| | | | |
|---|---|---|---|
| 2010/0117320 A1* | 5/2010 | Grozev | B60G 17/0523 280/124.16 |
| 2014/0081522 A1 | 3/2014 | Fry | |
| 2014/0095023 A1* | 4/2014 | Myyggen | |
| 2018/0304717 A1* | 10/2018 | Mettrick | B60G 17/033 |
| 2019/0359025 A1* | 11/2019 | Wager | B60G 21/073 |

FOREIGN PATENT DOCUMENTS

| | | | | |
|---|---|---|---|---|
| DE | 102015002249 A1 * | 8/2015 | ............ | B60W 40/13 |
| DE | 102016116856 A1 | 3/2018 | | |
| DE | 102016221955 A1 | 5/2018 | | |
| WO | WO19930597 A1 | 4/1993 | | |

OTHER PUBLICATIONS

Analysis on Mechanical Characteristics of Diaphragm Air Spring for Sem-active Suspension, Zhongxing et al., Apr. 1, 2011 International Conference on Consumer Electronics (Year: 2011).*
The PCT Search Report and Written Opinion dated Dec. 12, 2019, for PCT Application No. PCT/US2019/051913, 9 pages.
Extended European Search Report dated May 20, 2022 for European Patent Application No. 19865675.3, 10 pages.

* cited by examiner

CONTROLLING VEHICLE SUSPENSION SYSTEM USING PRESSURE SET POINT

BACKGROUND

Vehicles may include a suspension system to enhance the comfort of passengers of the vehicle or improve the performance of the vehicle as it travels across uneven surfaces and maneuvers through curves. A suspension system may include assemblies at each wheel of the vehicle including a spring to reduce the force transferred to a chassis of the vehicle as the vehicle travels across a depression or over bump in the surface, and a damper to control oscillations or rebound of the spring as it reacts to the force input. Some suspension systems may be used to adjust the ride height of the vehicle by adjusting the ride height at one or more wheels of the vehicle. However, such systems do not provide an ability to tailor the load at each wheel of the vehicle while achieving the desired ride height. As a result, although the ride height may be adjusted to a desired ride height, unequal loads at the wheels of the vehicle may result in undesirable vehicle performance over uneven surfaces and during maneuvering.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
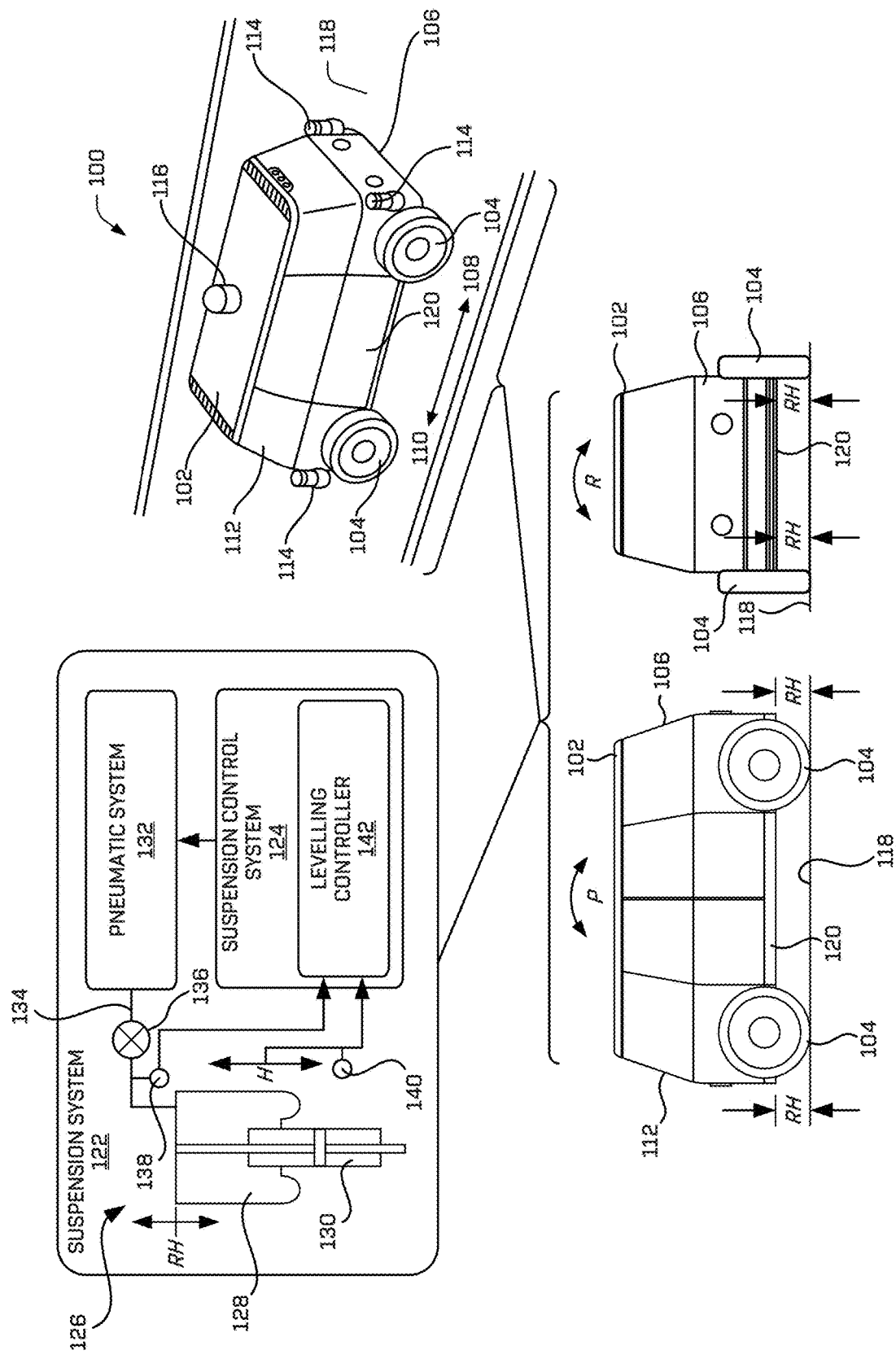
FIG. 1 includes a perspective view, a side view, and a front view of an example vehicle, including a schematic depiction of a portion of an example suspension system.

This disclosure is generally directed to a suspension system, components of a suspension system, and related methods. The suspension system may include a spring and damper assembly coupling a wheel to a vehicle chassis for controlling movement of the wheel relative to the vehicle chassis. The spring and damper assembly may include a pneumatic spring configured to change a length dimension, such that the ride height of the vehicle at the wheel may be adjusted. Though described herein with respect to a pneumatic system and setting a pressure thereof, the description is not meant to be so limiting. Particularly, similar techniques may be applied with other systems, such as, for example, controlling pressures within a hydraulic system, etc. The suspension system may further include a suspension control system configured to adjust pressure in the pneumatic spring to adjust a load on the wheel and the ride height of the vehicle at the wheel. For example, the suspension control system may be configured to determine a load on each wheel of the vehicle, determine a center of gravity of the vehicle, and based at least in part on the load at each wheel and the center of gravity, determine a pressure set point for each pneumatic spring to achieve a target load and ride height at each wheel of the vehicle. The pressure set point may be determined from a spring curve correlating pressure in the pneumatic spring and a change in dimension of the pneumatic spring. The suspension control system may be configured to dynamically adjust the pressure in each of the pneumatic springs to achieve the pressure set point and the target ride height at the wheel associated with the pneumatic spring. In some examples, this may be performed concurrently (e.g., substantially simultaneously) for each pneumatic spring and, in at least some examples, continuously. In some examples, the suspension control system may adjust the pressures in the pneumatic springs to level the ride height of the vehicle. By using the pressure set points to adjust the pneumatic springs, it may be possible to achieve a target load at each wheel of the vehicle while also achieving the target ride height at each wheel of the vehicle in a single step.

This disclosure is also generally directed to a system including a first pneumatic spring configured to be coupled to a first wheel and a vehicle chassis. The system may also include a first sensor configured to generate a first signal indicative of a current first ride height of the vehicle at the first wheel. The system may also include a second pneumatic spring configured to be coupled to a second wheel and the vehicle chassis. The system may further include a second sensor configured to generate a second signal indicative of a current second ride height of the vehicle at the second wheel. The system may also include a suspension control system configured to determine a current first pressure and a current second pressure and determine a target first ride height and a target second ride height. The suspension control system may also be configured to determine, based at least in part on the current first pressure, the current second pressure, the target first ride height, and the target second ride height, a first pressure set point for the first pneumatic spring and a second pressure set point for the second pneumatic spring. The suspension control system may also be configured to determine, based at least in part on the first pressure set point, the current first pressure, and a current first ride height, a first target pressure. The suspension control system may also be configured to determine, based at least in part on the second pressure set point, the current second pressure, and a second current ride height, a second target pressure. The suspension control system may also be configured to receive a signal from the first sensor and receive a signal from the second sensor and adjust pressure in the first pneumatic spring and the second pneumatic spring to approach the first target pressure and the second target pressure. In some examples of the above, the first sensor and second sensor may be the same sensor or comprise multiple sensors. In some examples, the suspension control system may be configured to determine a location indicative of a center of gravity of the vehicle, and, based at least in part on the location indicative of the center of gravity, determine the first pressure set point for the first pneumatic spring and the second pressure set point for the second pneumatic spring.

In some examples, the system may further include a pneumatic system in flow communication with the first pneumatic spring and the second pneumatic spring. The suspension control system may be configured to provide flow communication between the pneumatic system and each of the first pneumatic spring and the second pneumatic spring to adjust the pressure in each of the first pneumatic spring and the second pneumatic spring. In some examples, the suspension control system may be configured to receive a signal indicative of one of one or more of a roll or a pitch of the vehicle and determine the location indicative of the center of gravity based at least in part on the signal indicative of one or more of the roll or the pitch of the vehicle. For example, the system may further include one or more of an accelerometer or an inertial measurement unit, and the suspension control system may be configured to receive a signal from one or more of the accelerometer or the inertial measurement unit and determine one or more of the roll or the pitch of the vehicle based at least in part on the signal from one or more of the accelerometer or inertial measurement unit. In any such example enumerated herein, such pressure sets and ride heights may be determined to cause the vehicle to assume a particular orientation with respect to a reference surface (e.g., the ground). For instance, in a steep street in San Francisco, the ride height may be different for each wheel such that the passenger remains level whether travelling uphill or downhill.

In some examples, the system may also include a first pressure sensor configured to generate a signal indicative of a first pressure in the first pneumatic spring, and a second pressure sensor configured to generate a signal indicative of a second pressure in the second pneumatic spring. The suspension controller may be configured to determine the first pressure set point for the first pneumatic spring and the second pressure set point for the second pneumatic spring based at least in part on the signal indicative of the first pressure, the signal indicative of the second pressure, and the location indicative of the center of gravity.

In some examples, the system may further include a third pneumatic spring configured to be coupled to a third wheel and the chassis of the vehicle, and a third sensor configured to generate a third signal indicative of a current third ride height of the vehicle at the third wheel. The suspension control system may be configured to level a ride height of the vehicle by dynamically adjusting pressure in the first pneumatic spring, the second pneumatic spring, and the third pneumatic spring to achieve the first pressure set point, the second pressure set point, and a third pressure set point as the current first ride height, the current second ride height, and a current third ride height approach the target first ride height, the target second ride height, and a target third ride height, respectively. In some examples, the system may include four or more pneumatic springs, each configured to be coupled to a wheel of the vehicle, and the suspension control system may be configured to dynamically adjust pressure in each of the pneumatic springs to achieve respective pressure set points as the current ride height at each of the wheels approaches the respective target ride height. In some examples, the suspension control system may be configured to dynamically adjust the pressures concurrently (e.g., substantially simultaneously) to achieve the target pressures and ride heights.

In some examples of the system, the suspension control system may be configured to determine the pressure set points based at least in part on a spring curve of one or more of the pneumatic springs. The spring curve may correlate pressure in the pneumatic spring and a change in dimension of the pneumatic spring, for example, a change in a length dimension of the pneumatic spring that results in adjusting the ride height of the vehicle at a wheel coupled to the pneumatic spring.

This disclosure is also generally directed to a method including determining a load on a pneumatic spring at each wheel of a vehicle and determining a target ride height at each wheel of the vehicle. The method may further include determining, based at least in part on the load on the pneumatic spring at each wheel of the vehicle and the target ride height at each wheel of the vehicle, a pressure set point for each pneumatic spring. The method may further include determining, based at least in part on the pressure set point for each pneumatic spring and the target ride height at each wheel of the vehicle, a target pressure for each pneumatic spring. The method may also include adjusting pressure in each pneumatic spring to approach the target pressure for each pneumatic spring as a current ride height associated with each wheel of the vehicle approaches the target ride height at each wheel of the vehicle. In some examples, determining the load on the pneumatic spring at each wheel of a vehicle may include receiving a pressure signal from a pressure sensor in communication with each of the pneumatic springs. In some examples, the method may include determining a location indicative of a center of gravity of the vehicle, and determining the pressure set point for each of the pneumatic springs may include determining the pressure set point based at least in part on the load on the pneumatic spring at each wheel of the vehicle and the location indicative of the center of gravity of the vehicle. In some examples, determining the location indicative of the center of gravity of the vehicle may include determining one or more of a pitch of the vehicle or a roll of the vehicle, and determining the location indicative of the center of gravity of the vehicle based at least in part on one or more of the load on the pneumatic spring at each wheel of the vehicle, the pitch of the vehicle, or the roll of the vehicle. In some examples, determining one or more of the pitch of the vehicle or the roll of the vehicle may include receiving a signal from one or more of an accelerometer or an inertial measurement unit, and determining one or more of the pitch of the vehicle or the roll of the vehicle based at least in part on the signal received from one or more of the accelerometer or the inertial measurement unit.

The techniques and systems described herein may be implemented in a number of ways. Example implementations are provided below with reference to the figures.

FIG. 1 shows an example environment 100 through which an example vehicle 102 is traveling. The example vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times to those that are partially or fully autonomously controlled.

The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more internal combustion engines, one or more electric motors, hydrogen power, any combination thereof, and/or any other suitable power sources. Although the example vehicle 102 has four wheels 104, the systems and methods described herein may be incorporated into vehicles having fewer or a greater number of wheels, tires, and/or tracks. In some examples, the vehicle 102 may be a bi-directional vehicle. For example, the vehicle 102 may have four-wheel steering and may operate generally with equal performance characteristics in all directions, for example, such that a first end 106 of the vehicle 102 is the front end of the vehicle 102 when travelling in a first direction 108, and such that the first end 106 becomes the rear end of the vehicle 102 when traveling in the opposite, second direction 110, as shown in FIG. 1. Similarly, a second end 112 of the vehicle 102 is the front end of the vehicle 102 when travelling in the second direction 110, and such that the second end 112 becomes the rear end of the vehicle 102 when traveling in the opposite, first direction 108. These example characteristics may facilitate greater maneuverability, for example, in small spaces or crowded environments, such as parking lots and urban areas.

The vehicle 102 may travel through the environment 100, relying at least in part on sensor data indicative of objects in the environment 100. Such sensor data may be used, for example, at least to determine trajectories of the vehicle 102, determine a location of the vehicle 102, and/or determine one or more of a position and/or orientation of the vehicle 102 (together a pose). For example, as the vehicle 102 travels through the environment 100, one or more image capture devices 114, light detection and ranging (LIDAR) sensors 116, and/or other types of sensors, capture data associated with detected objects (e.g., vehicles, pedestrians, buildings, barriers, unevenness in the surface on which the vehicle 102 travels, etc.). In some examples, the image capture devices 114 may include, for example, RGB-cameras, monochrome cameras, intensity (grey scale) cameras, infrared cameras, ultraviolet cameras, depth cameras, stereo cameras, and the like. Other types of sensors may include, for example, radio detection and ranging (RADAR) sensors, one or more ultrasonic transducers, such as a sound navigation and ranging (SONAR) sensor, or other known sensor types. The data captured may be used, for example, as input for determining trajectories for the vehicle 102 and/or for other purposes (e.g., determining a pose, a localization, etc.).

As schematically depicted in FIG. 1, the vehicle 102 may travel on a surface 118, such as, for example, any road surface (e.g., tarmac, asphalt, gravel, etc.). As the vehicle 102 travels across uneven regions of the surface 118, the surface 118 exerts a force on the wheel or wheels 104 that is transmitted through the wheel(s) 104 to a vehicle chassis 120 of the vehicle 102 via a suspension system 122 coupling the wheels 104 to the vehicle chassis 120.

As shown in FIG. 1, the suspension system 122 may include a suspension control system 124 configured to control one or more components of the suspension system 122, for example, as described herein. In some examples, one or more (e.g., each) of the wheels 104 may be coupled to the vehicle chassis 120 by a spring and damper assembly 126 coupling a respective wheel 104 to the vehicle chassis 120 for movement of the wheel 104 relative to the vehicle chassis 120. The spring and damper assembly 126 may include a pneumatic spring 128 coupled to a damper member 130. In some examples, the pneumatic spring 128 may be capable of deforming to absorb forces imparted by the surface 118.

In some examples, for example, as shown in FIG. 1, the pneumatic spring 128 is configured to have its length dimension changed, resulting in changing a ride height RH of the vehicle 102 at the wheel 104 coupled to the vehicle chassis 120 by the pneumatic spring 128 of the spring and damper assembly 126 coupling the wheel 104 to the vehicle chassis 120. For example, as shown in FIG. 1, the suspension system 122 includes a pneumatic system 132 in selective flow communication with the pneumatic spring 128 and configured to selectively supply air (e.g., including air or similar gas) under pressure to the pneumatic spring to increase pressure in the pneumatic spring 128 and/or to increase its length dimension, or to release pressure from the pneumatic spring 128 to reduce the pressure in the pneumatic spring 128 and/or to reduce its length dimension. For example, the pneumatic system 132 may include a pressurized air source, for example, a pump and/or compressor configured to supply pressurized air and/or an air tank storing compressed air. Other sources of pressurized air are contemplated, and as used herein, "air" may include any gas or combination of gases that could serve as a pressurized gas in a manner consistent with the operation of the pneumatic spring 128 and related methods described herein.

As schematically depicted in FIG. 1, the suspension system 122 may include a line 134 providing flow communication between the pneumatic system 132 and the pneumatic spring 128. In the example shown, a valve 136 is provided in the line 134 to provide selective flow communication between the pneumatic system 132 and the pneumatic spring 128. The valve 136 may be configured to open to provide flow communication to the pneumatic spring 128, close to prevent flow communication to the pneumatic spring 128, and in some examples, release pressure from the pneumatic spring 128. Some examples of the suspension system 122 may include an additional valve independent from the valve 136 in the line 134 to release pressure from the pneumatic spring 128. In addition, in some examples, the suspension system 122 may also include a sensor 138 configured to generate a signal indicative of the pressure in the pneumatic spring 128, which may be used as described herein. The use of any suitable known type of pressure sensor is contemplated.

As schematically depicted in FIG. 1, the suspension control system 124 may be used to alter the ride height RH of the vehicle 102 at the location of one or more wheels 104 (e.g., at each of the wheels 104) of the vehicle 102 using the pneumatic spring 128 (e.g., the RH may be the same for all wheels or each wheel may have an independent RH). For example, operation of the valve 136 may be controlled to open the valve 136 to increase the length dimension of the pneumatic spring 128 to increase the ride height RH at the wheel 104 to which the pneumatic spring 128 is coupled. In addition, operation of the valve 136, or an additional valve, may be controlled to release pressure from the pneumatic spring 128 to reduce the length dimension of the pneumatic spring 128 to reduce the ride height RH at the wheel 104 to which the pneumatic spring 128 is coupled. In some examples, the pneumatic spring 128 at one or more (e.g., each) of the wheels 104 may be controlled independently of one another. In such an example, one or more of a pitch or roll of the vehicle 102 may be achieved. As shown in FIG. 1, the suspension system 122 may also include a sensor 140 configured to generate a signal indicative of the ride height RH of the vehicle 102 at the wheel 104 coupled to the spring and damper assembly 126. The sensor 140 may include any sensor configured to generate a signal indicative of the ride height RH at the wheel 104, such as, for example, a proximity sensor, or any one or more of the sensors above.

As shown in FIG. 1, the example suspension control system 124 includes a levelling controller 142 configured to level the ride height RH of the vehicle 102, as explained herein. In some examples, the levelling controller 142 may be configured to receive one or more signals generated by one or more of the sensors 138 and 140 associated with one or more wheels 104 of the vehicle 102, and, based at least in part on those signals, and in some examples, in part on signals received from other sensors and/or systems of the vehicle 102, the levelling controller 142 may be configured to cause the suspension system 122 to operate one or more of the pneumatic springs 128 coupled to one or more of the wheels 104 of the vehicle 102 to adjust the ride height RH at the one more wheels 104 to substantially level the vehicle 102. For example, the levelling controller 142 may be configured to alter the length dimension of one or more of the pneumatic springs 128 to adjust the pitch P and/or the roll R of the vehicle 102, so that the ride height RH of the vehicle 102 is substantially level, and in some examples, so that the load on each of the wheels 104 is substantially the same.

In some examples, the levelling controller 142 may be configured to adjust the ride height RH at one or more of the wheels, so that the ride height of the vehicle 102 is not substantially level. For example, the levelling controller 142 may be configured to allow adjustment of the RH at each of the wheels 104 to be set according to design parameters, which may in some examples, result in the ride heights RH at one or more of the wheels 104 differing from one another. For example, the ride heights RH at the front wheels 104 may be intentionally set to be relatively higher than the ride heights RH at the rear wheels 104, which may improve an aerodynamic characteristic (e.g., to provide relatively less aerodynamic drag). In some examples, the ride heights RH at the rear wheels 104 may be intentionally set to be relatively higher than the ride heights RH at the front wheels 104, which may improve an aerodynamic characteristic (e.g., to provide relatively more aerodynamic downforce to improver cornering performance). In some examples, the ride heights RH at the right-side wheels 104 may be set to be relatively higher than the ride heights RH at the left-side wheels 104, or the ride heights RH at the left-side wheels 104 may be set to be relatively higher than the ride heights RH at the right-side wheels 104, for example, to counteract a roll effect of travelling on a road having a lateral slope. In some examples, the levelling controller 142 may be configured to increase the ride heights RH at all the wheels 104, for example, to raise the center a gravity of the vehicle 104. In some examples, the levelling controller 142 may be configured to reduce the ride heights RH at all the wheels 104, for example, to lower the center a gravity of the vehicle 104. In some examples, the suspension control system 124 may be configured to receive map data and/or pose information associated with the current location and/or orientation of the vehicle 102 (e.g., as described herein with respect to FIG. 2). Based at least in part on the map data and/or pose information, the suspension control system 124 may be configured to set the RH at one or more of the wheels 104 of the vehicle 102 to account for an incline in the surface 118, a decline in the surface 118, a lateral slope of the surface 118, and/or uneven surfaces.

In some examples, the levelling controller 142 may be configured to allow adjustment of the load at each of the wheels 104 to be set according to design preferences, which may in some examples, result in the loads at one or more of the wheels 104 differing from one another. For example, the loads at the front wheels 104 may be intentionally set to be relatively higher than the loads at the rear wheels 104, for example, during a braking maneuver to improve braking performance. In some examples, the loads at the rear wheels 104 may be intentionally set to be relatively higher than the loads at the front wheels 104, for example, during acceleration to improve traction and acceleration. In some examples, the loads at the right-side wheels 104 may be set to be relatively higher than the loads in the left-side wheels 104, for example, as the vehicle 102 is turning to the left to improve cornering performance. Similarly, in some examples, the loads at the left-side wheels 104 may be set to be relatively higher than the loads in the right-side wheels 104, for example, as the vehicle 102 is turning to the right to improve cornering performance.

Figure 2:
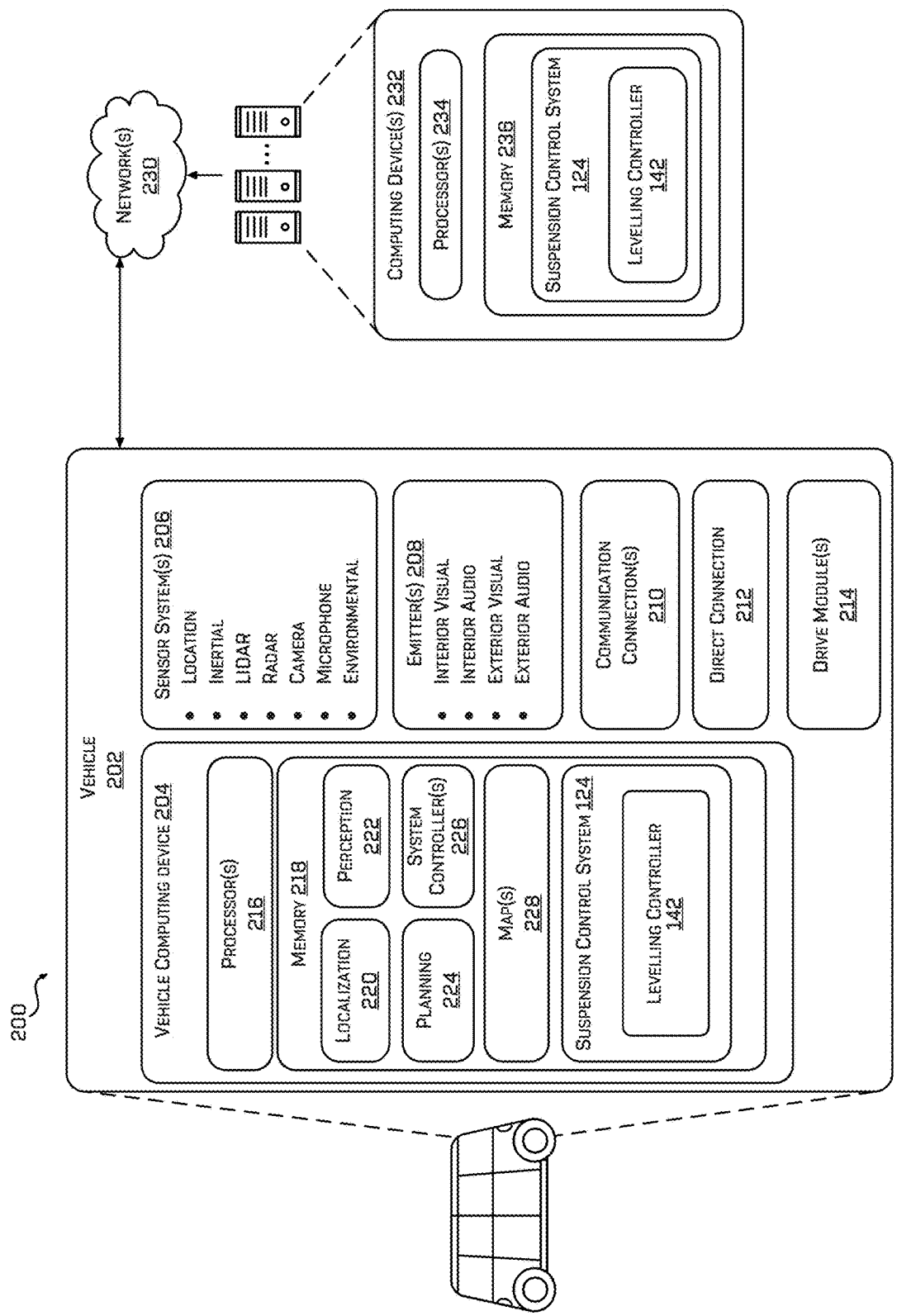
FIG. 2 is a block diagram of an example system for implementing the suspension system and related techniques described herein.

FIG. 2 depicts a block diagram of an example system 200 for implementing the techniques described herein. In at least some examples, the system 200 may include a vehicle 202, which may correspond to the example vehicle 102 shown in FIG. 1. The vehicle 202 may include a vehicle computing device 204, one or more sensor systems 206, one or more emitters 208, one or more communication connections 210, at least one direct connection 212, and one or more drive modules 214.

The vehicle computing device 204 may include one or more processors 216 and memory 218 communicatively coupled with the one or more processors 216. In the illustrated example, the vehicle 202 is an autonomous vehicle. However, the vehicle 202 may be any other type of vehicle. In the illustrated example, the memory 218 of the vehicle computing device 204 stores a localization component 220, a perception component 222, a planning component 224, one or more system controllers 226, one or more maps 228, and an example suspension control system 124, including an example levelling controller 142. Though depicted in FIG. 2 as residing in memory 218 for illustrative purposes, it is contemplated that the localization component 220, the perception component 222, the planning component 224, the one or more system controllers 226, the one or more maps 228, and the suspension control system 124 may additionally, or alternatively, be accessible to the vehicle 202 (e.g., stored on, or otherwise accessible by, memory remote from the vehicle 202).

In at least one example, the localization component 220 may be configured to receive data from the sensor system(s) 206 to determine a position and/or orientation of the vehicle 202 (e.g., one or more of an x-, y-, z-position, roll, pitch, or yaw). In some examples, such a position/orientation may be determined relative to a map, described below, such that a ride height for each wheel may be determined. For example, the localization component 220 may include and/or request/receive a map of an environment and may continuously determine a location and/or orientation of the autonomous vehicle within the map. In some examples, the localization component 220 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the autonomous vehicle. In some examples, the localization component 220 may provide data to various components of the vehicle 202 to determine an initial position of an autonomous vehicle for generating a candidate trajectory, as discussed herein.

In some examples, the perception component 222 may be configured to perform object detection, segmentation, and/or classification. In some examples, the perception component 222 may provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional and/or alternative examples, the perception component 222 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 224 may determine a path for the vehicle 202 to follow to traverse through an environment. For example, the planning component 224 may determine various routes and trajectories and various levels of detail. For example, the planning component 224 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 224 may generate an instruction for guiding the autonomous vehicle along at least a portion of the route from the first location to the second location. In at least one example, the planning component 224 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 202 to navigate.

In at least one example, the planning component 224 may determine a location of a user based on image data of an environment received from the user using, for example, bags of binary words with image-based features, artificial neural network, and the like. Further, the planning component 224 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 202 may stop to pick up a passenger. In at least one example, the planning component 224 may determine a pickup location based at least in part on determining a user identity (e.g., determined via image recognition or received as an indication from a user device, as discussed herein).

In at least one example, the vehicle computing device 204 may include one or more system controllers 226, which may be configured to control steering, propulsion, braking, safety, emitters, communication, and other systems of the vehicle 202. These system controller(s) 226 may communicate with and/or control corresponding systems of the drive module(s) 214 and/or other components of the vehicle 202.

The memory 218 may further include one or more maps 228 that may be used by the vehicle 202 to navigate within the environment. For the purpose of this discussion, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment and may be loaded into working memory as needed. In at least one example, the one or more maps 228 may include at least one map (e.g., images and/or a mesh). In some example, the vehicle 202 may be controlled based at least in part on the maps 228. That is, the maps 228 may be used in connection with the localization component 220, the perception component 222, and/or the planning component 224 to determine a location of the vehicle 202, identify objects in an environment, and/or generate routes and/or trajectories to navigate within an environment.

In some examples, the one or more maps 228 may be stored on a remote computing device(s) (such as the computing device(s) 232) accessible via network(s) 230. In some examples, multiple maps 228 may be stored based on, for example, a characteristic (e.g., type of entity, time of day, day of week, season of the year, etc.). Storing multiple maps 228 may have similar memory requirements but may increase the speed at which data in a map may be accessed.

As shown in FIG. 2, in some examples, the suspension control system 124 may be stored in the memory 218 of the computing device 204 of the vehicle 202 or remote from the vehicle 202 in the memory 236 of the computing device(s)

232. In some examples, some portions of the suspension control system 124 may be stored in the memory 218 of the computing device 204 of the vehicle 202, and other portions of suspension control system 124 may be stored remotely in the memory 236 of the computing device(s) 232, and the separately located portions of the suspension control system 124 may operate together in a coordinated manner.

In some examples, aspects of some or all of the components discussed herein may include any models, algorithms, and/or machine learning algorithms. For example, in some examples, the components in the memory 218 and/or the memory 236 may be implemented as a neural network.

As described herein, an exemplary neural network is a biologically inspired algorithm which passes input data through a series of connected layers to produce an output. Each layer in a neural network may also include another neural network or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 206 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. The sensor system(s) 206 may include multiple examples of each of these or other types of sensors. For example, the LIDAR sensors may include individual LIDAR sensors located at the corners, front, back, sides, and/or top of the vehicle 202. As another example, the camera sensors may include multiple cameras disposed at various locations about the exterior and/or interior of the vehicle 202. The sensor system(s) 206 may provide input to the vehicle computing device 204. Additionally, or alternatively, the sensor system(s) 206 may send sensor data, via the one or more networks 230, to the one or more computing device(s) at a particular frequency, after a lapse of a predetermined period of time, in near real-time, etc.

The vehicle 202 may also include one or more emitters 208 for emitting light and/or sound, as described above. The emitters 208 in this example include interior audio and visual emitters to communicate with passengers of the vehicle 202. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The vehicle 202 may also include one or more communication connection(s) 210 that enable communication between the vehicle 202 and one or more other local or remote computing device(s). For example, the communication connection(s) 210 may facilitate communication with other local computing device(s) on the vehicle 202 and/or the drive module(s) 214. Also, the communication connection(s) 210 may allow the vehicle 202 to communicate with other nearby computing device(s) (e.g., other nearby vehicles, traffic signals, etc.). The communications connection(s) 210 also enable the vehicle 202 to communicate with a remote teleoperations computing device or other remote services.

The communications connection(s) 210 may include physical and/or logical interfaces for connecting the vehicle computing device 204 to another computing device or a network, such as network(s) 230. For example, the communications connection(s) 210 may enable Wi-Fi-based communication, such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 202 may include one or more drive modules 214. In some examples, the vehicle 202 may have a single drive module 214. In at least one example, if the vehicle 202 has multiple drive modules 214, individual drive modules 214 may be positioned on opposite ends of the vehicle 202 (e.g., the front and the rear, etc.). In at least one example, the drive module(s) 214 may include one or more sensor systems to detect conditions of the drive module(s) 214 and/or the surroundings of the vehicle 202.

By way of example and not limitation, the sensor system(s) 206 may include one or more wheel encoders (e.g., rotary encoders) to sense rotation of the wheels (e.g., wheels 104 in FIG. 1)) of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 214. In some cases, the sensor system(s) on the drive module(s) 214 may overlap or supplement corresponding systems of the vehicle 202 (e.g., sensor system(s) 206).

The drive module(s) 214 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 214 may include a drive module controller, which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 214. Furthermore, the drive module(s) 214 also include one or more communication connection(s) that enable communication by the respective drive module with one or more other local or remote computing device(s).

In at least one example, the direct connection 212 may provide a physical interface to couple the one or more drive module(s) 214 with the body of the vehicle 202. For example, the direction connection 212 may allow the transfer of energy, fluids, air, data, etc. between the drive module(s) 214 and the vehicle 202. In some examples, the direct connection 212 may further releasably secure the drive module(s) 214 to the body of the vehicle 202.

In at least one example, the localization component 220, perception component 222, the planning component 224, and/or the suspension control system 124 may process sensor data, as described above, and may send their respective outputs, over the one or more network(s) 230, to one or more computing device(s) 232. In at least one example, the localization component 220, the perception component 222, the planning component 224, and/or the suspension control system 124 may send their respective outputs to the one or more computing device(s) 232 at a particular frequency, after a lapse of a predetermined period of time, in near real-time, etc.

The processor(s) 216 of the vehicle 202 and/or the processor(s) 234 of the computing device(s) 232 may be any suitable processor capable of executing instructions to process data and perform operations as described herein. By way of example and not limitation, the processor(s) 216 and 234 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 218 and 236 are examples of non-transitory computer-readable media. The memory 218 and 236 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 2 is illustrated as a distributed system, in alternative examples, components of the vehicle 202 may be associated with the computing device(s) 232, and/or components of the computing device(s) 232 may be associated with the vehicle 202. That is, the vehicle 202 may perform one or more of the functions associated with the computing device(s) 232, and vice versa.

Figure 3:
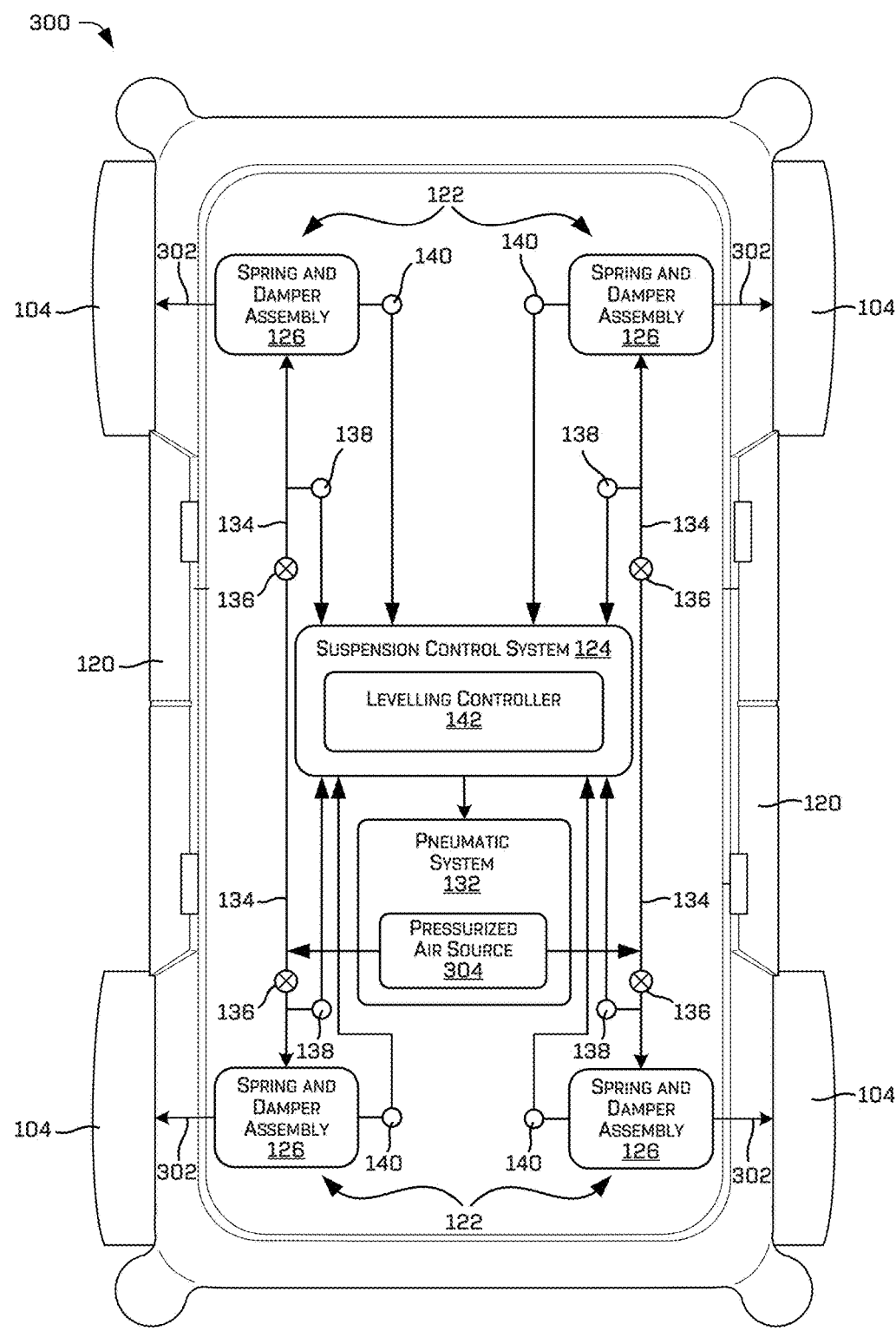
FIG. 3 is a schematic top view of an example vehicle including an example suspension system.

FIG. 3 is a schematic top view of an example vehicle 300, which may correspond to the example vehicle 102 shown in FIG. 1. The example vehicle 300 may include the example suspension system 122 shown in FIG. 3. The example vehicle 300 includes four wheels 104 located generally at four respective corners of the vehicle chassis 120. Each of the wheels 104 may be coupled to the vehicle chassis 120 via a respective spring and damper assembly 126. For example, the spring and damper assemblies 126 may be coupled to a respective wheel 104 via suspension control arms 302 schematically depicted in FIG. 3. As explained herein, in some examples, one or more (e.g., each) of the spring and damper assemblies 126 may include a pneumatic spring 128 (see FIG. 1) coupled to respective control arms 302, and the pneumatic springs 126 may be configured to alter the ride height RH of the vehicle 300 at the respective wheels 104 by increasing and/or decreasing the length dimension of the pneumatic spring 126, for example, as described herein. In some examples, the suspension system 122 may be configured to permit two or four of the wheels 104 to pivot to create steering angles for maneuvering the vehicle 300.

As shown in FIG. 3, the example vehicle 300 also includes a suspension control system 124 including, in some examples, a levelling controller 142 configured to level the ride height RH of the vehicle 300, for example, as described herein. The example vehicle 300 also includes a pneumatic system 132 including a pressurized air source 304 (e.g., a pump, compressor, and/or a tank of compressed air), which may be used to adjust the ride RH of the vehicle 300 at one or more of the wheels 104 of the vehicle 300, for example, as described herein.

As shown in FIG. 3, the suspension system 122 may include a line 134 providing flow communication between the pressurized air source 304 of the pneumatic system 132 and the pneumatic springs 128 of the spring and damper assemblies 126 (see FIG. 1). In the example shown, a valve 136 is provided in the line 134 to provide selective flow communication between the pressurized air source 304 and each of the pneumatic springs 126 of each of the spring and damper assemblies 126. The valves 136 may be configured to open to provide flow communication to the respective pneumatic springs 128, close to prevent flow communication to the respective pneumatic springs 128, and in some examples, release pressure from the respective pneumatic springs 128. Some examples of the suspension system 122 may include one or more additional valves independent from the valves 136 in the line 134 to release pressure from the respective pneumatic springs. The example shown in FIG. 3 also includes sensors 138 configured to generate respective signals indicative of the pressure in the respective pneumatic springs 128, which may be used as described herein. The suspension system 122 shown in FIG. 3 also includes respective sensors 140 configured to generate respective signals indicative of the respective ride heights RH of the vehicle 300 at the respective wheels 104 coupled to the respective spring and damper assemblies 126.

The levelling controller 142 may be configured to level the ride height RH of the vehicle 300, as explained herein. In some examples, the levelling controller 142 may be configured to receive one or more signals generated by one or more of the sensors 138 and/or 140 associated with the respective wheels 104 of the vehicle 300, and based at least in part on those signals, the levelling controller 142 may be configured to cause the suspension system 122 to operate one or more of the pneumatic springs 128 of the spring and damper assemblies 126 coupled to one or more of the wheels 104 of the vehicle 300 to adjust the ride height RH at the respective wheels 104 to substantially level the vehicle 102, for example, as described herein. For example, the levelling controller 142 may be configured to alter the length dimension of one or more of the pneumatic springs 128 to adjust the pitch P and/or the roll R of the vehicle 300, so that the ride height RH of the vehicle 300 is substantially level, and in some examples, so that the load on each of the wheels 104 is substantially the same. In some examples, the levelling controller 142 may be configured to receive signals from other sensors and/or systems of the vehicle 300, and based at least in part on those signals, cause the suspension system 122 to operate one or more of the pneumatic springs 128 of the spring and damper assemblies 126 coupled to one or more of the wheels 104 of the vehicle 300 to adjust the ride height RH at the respective wheels 104 to substantially level the vehicle 102. For example, the levelling controller 142 may receive one or more signals from one or more of the sensor system(s) 206 (e.g., from one or more accelerometers, one or more inertial measurement units, the localization component 220, the perception component 222, the planning component 224, etc.), and based at least in part on such signals, cause the one or more of the pneumatic springs 128 to adjust the ride height RH at the respective wheels 104, for example, to substantially level the vehicle 102.

Figure 4A:
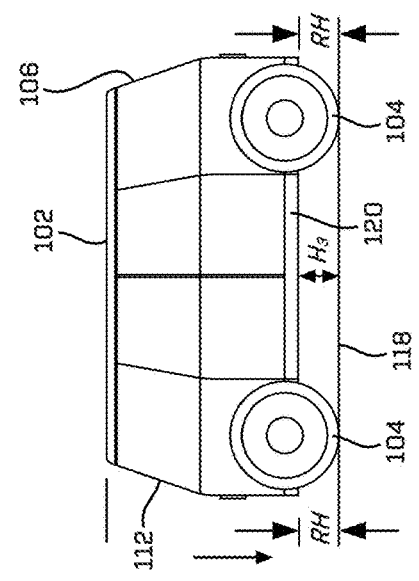
FIG. 4A is a side view of a first instance of an example leveling sequence in which an example vehicle reaches a target ride height and level attitude for travel.
Figure 4B:
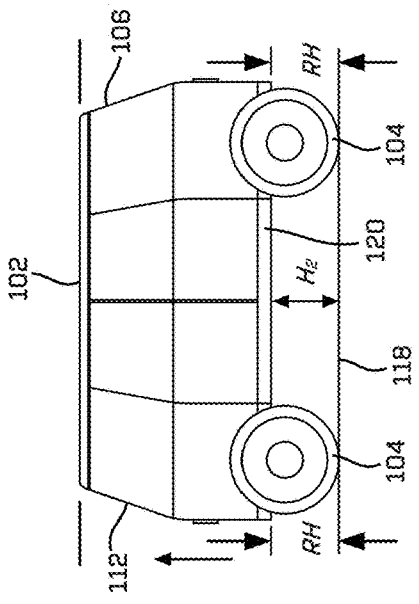
FIG. 4B is a side view of a second instance of the example leveling sequence in which the vehicle raises itself prior to achieving the target ride height and level attitude.
Figure 4C:
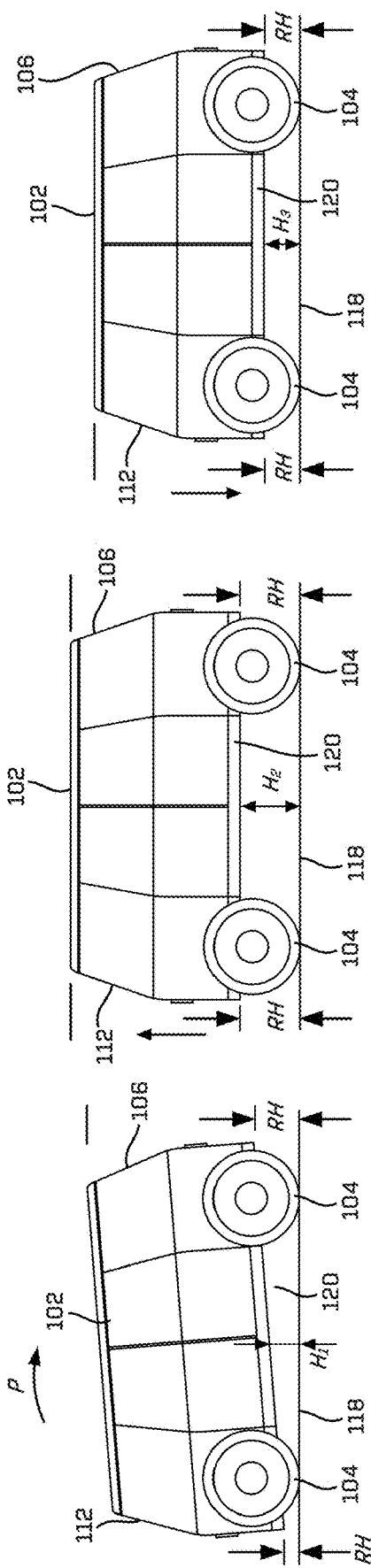
FIG. 4C is a side view of a third instance of the example leveling sequence in which the vehicle settles to achieve the target ride height and level attitude for travel.
Figure 4D:
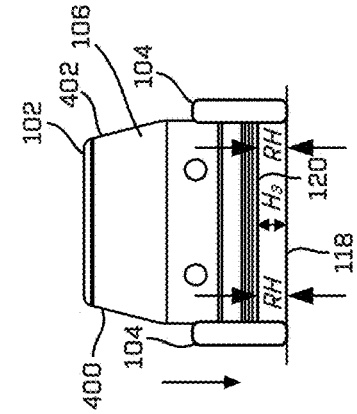
FIG. 4D is a front view of the first instance shown in FIG. 4A.
Figure 4E:
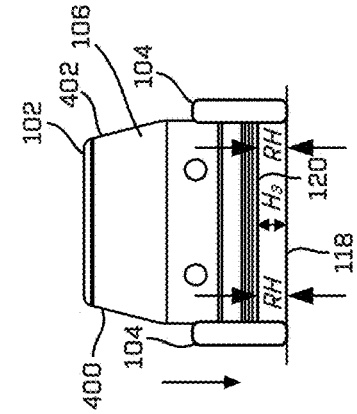
FIG. 4E is a front view of the second instance shown in FIG. 4B.
Figure 4F:
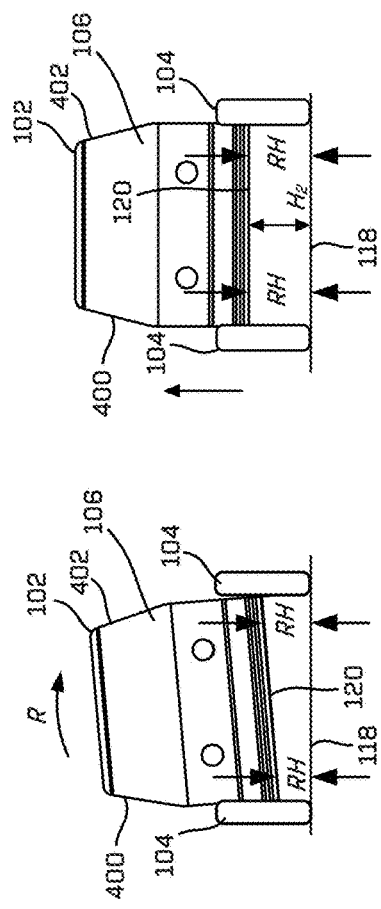
FIG. 4F is a front view of the third instance shown in FIG. 4C.

FIGS. 4A, 4B, and 4C are side views, and FIGS. 4D, 4E, and 4F are front views, of an example leveling sequence in which an example vehicle 102 reaches a target ride height and level attitude for travel. For example, the suspension control system 124 may include a leveling controller 142 (FIGS. 1-3) configured to control the attitude and/or ride height of the vehicle 102 using, at least in part, one or more (e.g., four) of the pneumatic springs 128, such that the ride height RH at each of the wheels 104 is adjusted to achieve a substantially level attitude and a target ride height RH. The vehicle 102 shown in FIGS. 4A-4F includes four wheels 104, and in some examples, a pneumatic spring 128 may be provided at each of the four wheels 104. It is contemplated the vehicle 102 may have fewer or more wheels 104 and a corresponding number of pneumatic springs 128.

In some examples, the suspension control system 124 may be configured to reset the level attitude and/or ride height, for example, when the vehicle 102 is activated and/or when the load (e.g., passengers) is changed and/or moved relative to the vehicle chassis 120 (e.g., when the load and/or center of gravity of the vehicle 102 is altered). In some examples, the leveling controller 142 may be configured to substantially equalize the load on each of the one or more wheels 104, achieve the target ride height, and achieve the desired attitude of the vehicle chassis 120 (e.g., a substantially leveled attitude), possibly modified as described herein.

As shown in FIGS. 4A and 4D, the example vehicle 102 is in a position such that the attitude of the vehicle chassis 124 is not substantially level. For example, as shown in FIG. 4A, the ride height RH at the rear 112 of the vehicle 102 is lower than the ride height RH at the front 106 of the vehicle 102. Thus, in order to level the vehicle 102, the pitch P must be altered to level the vehicle 102 relative to the front 106 and back 112 of the vehicle 102. In addition, as shown in FIG. 4D, which is a front view corresponding to the side view shown in FIG. 4A, the ride height RH at the right side 400 of the vehicle 102 (i.e., from the perspective of looking out the front 106 of the vehicle 102 as shown) is lower than the ride height RH at the left side 402 of the vehicle 102. Thus, in order to level the vehicle 102, the roll R must be altered to level the vehicle 102 relative to the right side 400 and left side 402 of the vehicle 102. This example might correspond to an instance of a passenger boarding the vehicle 102 in the right-side rear of the vehicle 102, which would be expected to reduce the ride height RH at the right-side rear of the vehicle 102 relative to the rest of the vehicle 102. In the example shown, the ride height $H_1$ is also at a relatively reduced level. However, in some instances, the vehicle 102 may not necessarily also have a reduced ride height. In some examples, at the beginning of the levelling sequence, the levelling controller 142 may cause the pneumatic springs 128 to reduce respective length dimensions, so that the ride height RH of the vehicle 102 is reduced to a minimum ride height RH. Thereafter, the levelling controller 142 may continue performing the levelling sequence.

In some examples, as explained herein and schematically depicted in FIGS. 4B and 4E, which is a front view corresponding to FIG. 4B, upon activation of the leveling controller 142, the leveling controller 142 may cause one or more of the pneumatic springs 128 to increase the respective length dimension to substantially level the vehicle 102 (and in some examples, the raising (or lowering) the ride height RH, for example, to $H_2$, which is relatively higher than $H_1$, while still substantially levelling the vehicle chassis 120. Thereafter, in some examples, as shown in FIGS. 4C and 4F, which is a front view corresponding to FIG. 4C, the leveling controller 142 may cause one or more of the pneumatic springs 128 to partially shorten, such that the vehicle 102 achieves the target ride height $H_3$, which, in the example shown, is greater than $H_1$ and less than $H_2$, with the vehicle chassis 120 is at a substantially level attitude. In some examples, as noted herein, in this example manner, the leveling controller 142 may substantially equalize the load on each of the one or more (e.g., the four) wheels 104, achieve the target ride height, and/or achieve the desired attitude of the vehicle chassis 120. In some examples, this example attitude leveling and/or ride height adjusting procedure may be performed according to one or more of the strategies discussed herein.

For example, the leveling controller 142 may be configured to use the following example process to determine the target load on each wheel 104, the target ride height RH at each wheel 104, the adjustment of the length dimension of one or more of the pneumatic springs 128 corresponding to the target ride height, and/or the pressure of the pneumatic spring 128 corresponding to the target load on each wheel 104 and the target ride height RH at each wheel 104. For example, the leveling controller 142 may be configured to determine the center of gravity of the vehicle 102 based at least in part on one or more of a load on each of the four pneumatic springs 128 (e.g., for a vehicle 102 having four wheels 104) prior to leveling, the pitch angle P of the vehicle chassis 120 prior to leveling, and/or the roll angle R of the vehicle chassis 120 prior to leveling. The load on the four pneumatic springs 128 may be determined, for example, based on the pressure of each of the pneumatic springs 128 and/or according to known methods, and the roll angle and/or pitch angle may be determined via accelerometer(s), inertial measurement unit(s), inclinometer(s), and/or based on one or more signals received from the sensor system(s) 206 (FIG. 2). Thereafter, the leveling controller 142 may be configured to determine a target load and a pressure set point for each of the four pneumatic springs 128 (e.g., the target load distribution for each of the four pneumatic springs 128) based at least in part on the center of gravity and/or a direction of travel of the vehicle 102. Thereafter, the leveling controller 142 may be configured to control operation of the pneumatic system 132 using one or more of the valves 134 and/or one or more signals from one or more of the sensors 138 or 140 to adjust the length dimension and/or the pressures of the four pneumatic springs 128 to dynamically adjust respective pressures of the four pneumatic springs 128 to achieve a pressure set point in each of the four pneumatic springs 132 as the ride height RH at each of the wheels 104 of the vehicle 102 adjusts toward the desired or target ride height RH.

In some examples, the leveling controller 142 may use the following formula to calculate the force in each of the pneumatic springs 128:

$$F(x) = a_1 \frac{p_0 \cdot v_0^k}{(v_0 - x \cdot a_1)^k}$$

where F(x) is the spring force (N), $a_1$ is the pneumatic spring area (m$^2$), $p_0$ is nominal pressure (Pa), $v_0$ is the nominal volume (m$^3$), x is the displacement (m), and k is the polytrophic expansion value. More generally, for example, in those examples where an auxiliary spring is used, the force per spring may be described as:

$$F(x) = a_1 \frac{p_0 \cdot v_0^k}{(v_0 + ASAC_{pos} \cdot a_2 - x \cdot a_1)^k} + f_0 + x \cdot k_s,$$

where, $f_0$ is the preloaded force of an auxiliary spring, $k_s$ is the spring constant of the auxiliary spring, $ASAC_{pos}$ is the ASAC position, and $a_2$ is the cross-sectional area of the auxiliary spring. In any example described herein where an auxiliary spring is not used, $f_0$, $k_s$, ASAC, and $a_2$ may all be set equal to zero for calculating desired and target pressures.

Figure 5:
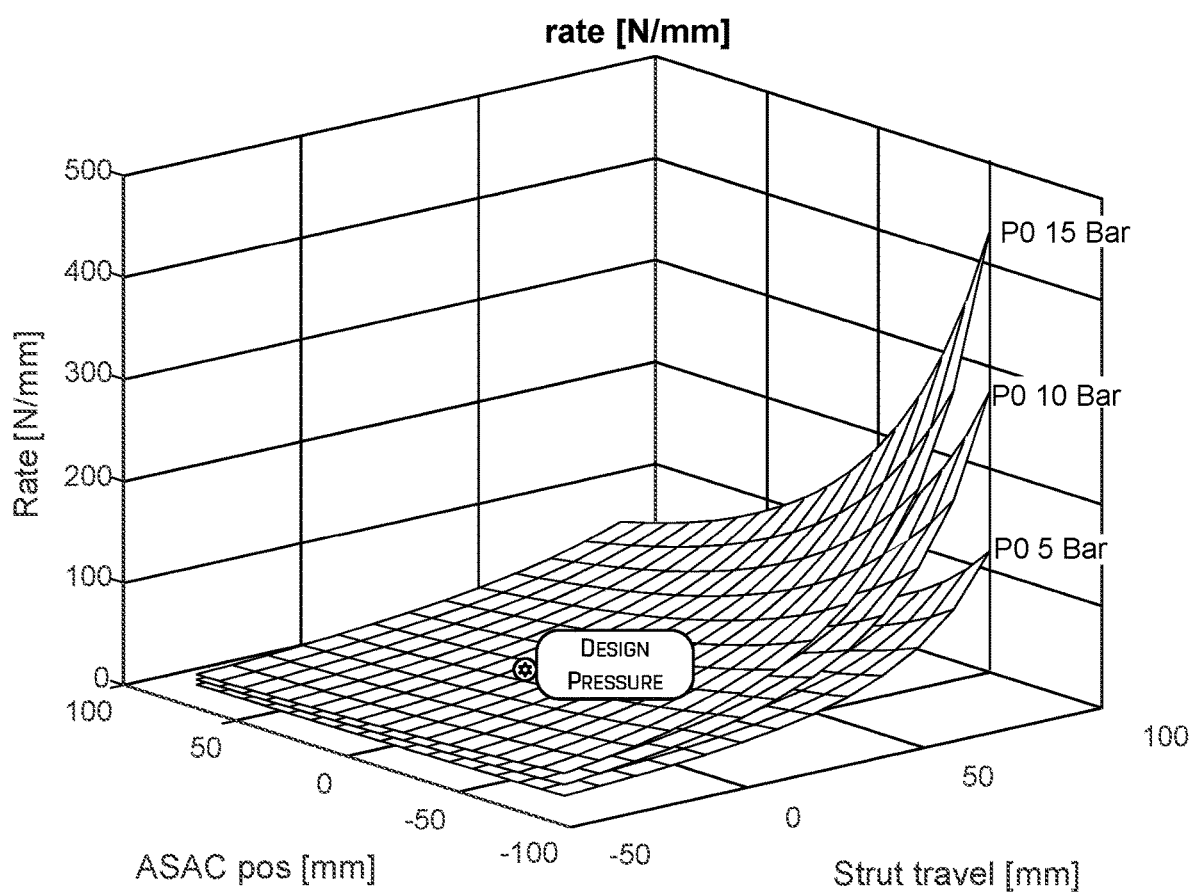
FIG. 5 is a three-dimensional graph showing example spring curves for an example pneumatic spring as a function of spring rate (Newtons per millimeter), ASAC position (millimeters), and strut travel (millimeters).

The above-noted example formula for calculating the force on each spring may be graphically depicted by one or more spring curves. For example, FIG. 5 is a three-dimensional graph showing example spring curves for an example pneumatic spring as a function of spring rate (Newtons per millimeter), ASAC position (millimeters), and strut travel (millimeters). Each of the three-dimensional surfaces shown in FIG. 5 graphically represents a constant pressure (e.g., a design pressure) for a given pneumatic spring as a function of spring rate, ASAC position, and strut travel. In examples not having an auxiliary spring, ASAC may be set to zero, which results in two-dimensional spring curves, for example, such as the examples shown in FIG. 7, as explained in more detail below.

Figure 6:
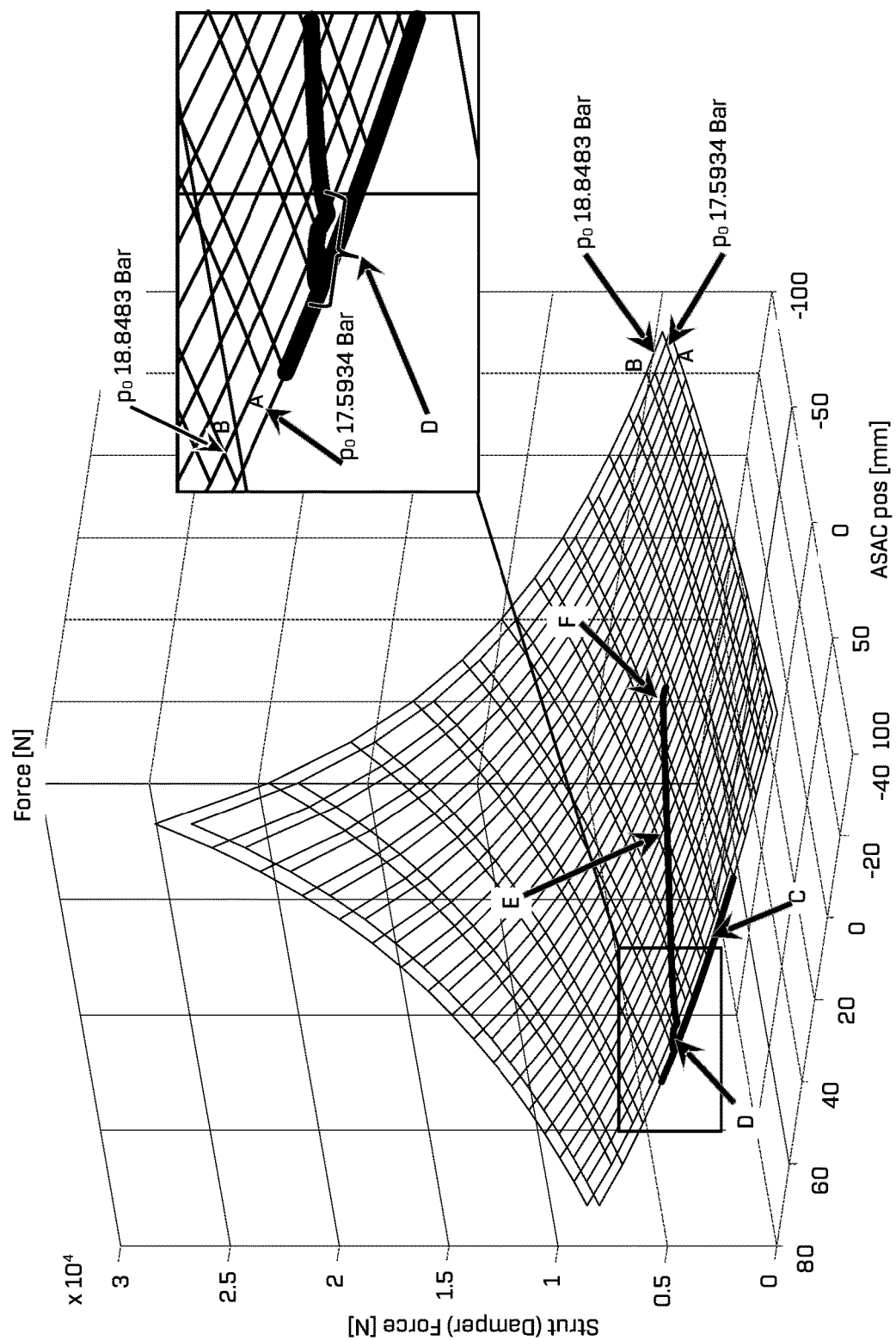
FIG. 6 is a three-dimensional graph showing example changes in strut travel (millimeters) as a function of strut force (Newtons), and ASAC position (millimeters) during an example process for adjusting pressure in an example pneumatic spring and ride height as described herein.

FIG. 6 is a three-dimensional graph showing example changes in strut travel (millimeters) as a function of strut force (Newtons) and ASAC position (millimeters) during an example process for adjusting pressure in an example pneumatic spring and ride height as described herein. Surfaces A and B shown in FIG. 6 represent constant pressure (e.g., 17.5934 Bar and 18.8483 Bar, respectively), and points C, D, E, and F and the associated arrows graphically depict an example process for increasing pressure in an example pneumatic spring to achieve a design pressure and a target ride height, as depicted by the change in strut force, strut travel (correlating to ride height), and ASAC position, as these parameters move from point C to point D, from point D to point E, and finally from point E to point F, where the design pressure and target ride height are achieved. The inset of FIG. 6 shows the pressure in the pneumatic spring increasing from the pressure of surface A to the pressure of surface B, which correlates to the description below.

In some examples, the leveling controller 142 dynamically calculates the set point pressure as a function of the calculated design load (e.g., a pressure, $p_0$) and ride height RH measured during the adjustment process (e.g., at each of the wheels 104). In some such examples, the adjustment may be performed, even when the vehicle chassis 120 is disturbed because the target pressure datum follow motion of the pneumatic springs 128. In some examples, the adjustment may be performed on an uneven surface. In some examples, only a single adjustment cycle may be performed to reach the target pressures. In some examples, all four pneumatic springs 128 may be concurrently (e.g., substantially simultaneously) adjusted to achieve the respective target pressures.

Once a pressure and/or load on the vehicle is determined, a target initial pressure can be determined as:

$$p_{0\_desired} = \frac{\left(\frac{F_{des}}{a_1} - \frac{f_0}{a_1} - \frac{x_{des} \cdot k_s}{a_1}\right) \cdot (v_0 + ASAC_{pos\_des} \cdot a_2 - x_{des} \cdot a_1)^k}{(v_0)^k}$$

where $F_{des}$ is a target load distribution (force) and $x_{des}$ is a target spring displacement.

In those examples using an auxiliary air spring, the spring can be bled to an initial position ($ASAC_{pos\_0}$). Once set, the target pressure for each spring can be calculated as:

$$p_{target} = \frac{(p_{0\_des} \cdot v_0^k)}{(v_0 + ASAC_{pos\_0} \cdot a_2 - x_{actual} \cdot a_1)^k} + \frac{f_0 + x_{actual} \cdot k_s}{a_1},$$

where $x_{actual}$ is a determined ride hide RH (or actual ride height) of the vehicle 102 (as may be determined for each pneumatic spring 128 in accordance with a target length dimension for each pneumatic spring 128). By setting the pressure in each pneumatic spring 128 to the target pressure, the vehicle 102 is then set at the target ride height RH and/or attitude. After being set, in those examples using an auxiliary spring, the auxiliary spring position can be adjusted to a target position ($ASAC_{pos\_des}$).

Figure 7:
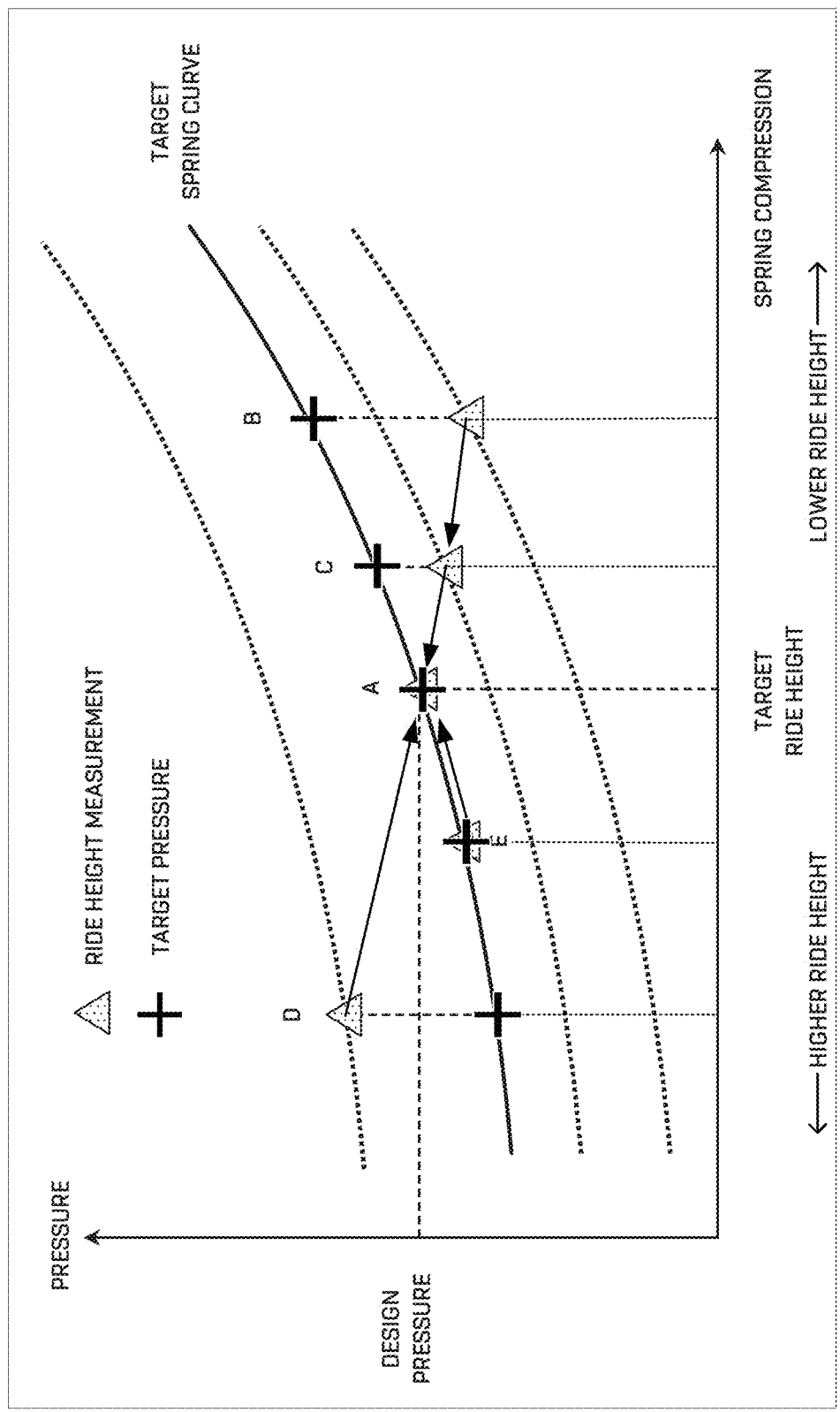
FIG. 7 is a two-dimensional graph showing example changes in pneumatic spring pressure and ride height during an example process for adjusting pressure in an example pneumatic spring and ride height as described herein.

FIG. 7 is a two-dimensional graph showing example changes in pneumatic spring pressure and ride height during an example process for adjusting pressure in an example pneumatic spring and ride height as described herein. As noted herein, in examples not having an auxiliary spring (or having a constant, unchanged, offset), ASAC may be set to zero (or the respective constant offset), which results in two-dimensional spring curves, for example, such as the examples depicted in FIG. 7. FIG. 7 graphically depicts an example process for adjusting pressure in an example pneumatic spring to achieve a design pressure of the pneumatic spring and a target ride height of a wheel of the vehicle associated with the pneumatic spring, as depicted by point A in FIG. 7. An initial (current) condition of the pneumatic spring is depicted by the triangle along line B indicating that the current measured ride height is lower than the target ride height depicted at point A (i.e., to the right of the target ride height), and the pressure in the pneumatic spring is lower than the design pressure depicted at point A. Thus, in the example shown, pressure in the pneumatic spring will be adjusted, such that the pneumatic spring approaches (in some instances achieves) the design pressure and/or the target ride height, changing from the condition at point B to the condition at point A.

As shown in FIG. 7, the design pressure is determined. For example, the overall vehicle weight and desired load distribution may be determined, so that the design pressure for each pneumatic spring may be determined. As noted previously herein, the desired load distribution may be set so that each of the wheels supports substantially the same weight or so that one or more of the wheels supports relatively more weight than one or more of the other wheels, for example, based on considerations described herein. In addition, the target ride height at each of the wheels may be determined. The target ride height may be determined based on a number of factors, such as, for example, one or more of the terrain over which the vehicle will travel, desired handling characteristics of the vehicle, desired aerodynamic characteristics (e.g., angle of attack of the vehicle), etc.

Once the design pressure and target ride height are determined, a target spring curve may be determined for the pneumatic spring based on, for example, the design pressure and the target ride height for a vehicle wheel associated with the pneumatic spring. As shown in FIG. 7, the spring curves for a pneumatic spring are curves depicting a correlation between the amount of spring compression and the spring pressure or force at a constant spring pressure. The target spring curve is the spring curve on which the design pressure and the target ride height coincide, for example, the solid line passing through the triangle of line A in FIG. 7. Once the target spring curve has been determined, a target pressure may be determined from the target spring curve. This target pressure is determined as the intersection of the current ride height with the target spring curve. In the example depicted, the target pressure is depicted as the cross intersecting with line B. The pressure in the pneumatic spring may be adjusted (e.g., increased as shown) to approach the target pressure. As the pressure is increased toward the target pressure, the ride height may be measured, and in the example shown, the ride height is increasing toward the target ride height at line A. In some examples, as the ride height increases toward the target ride height at line A, target pressure may be updated (e.g., recalculated) by identifying the pressure on the target spring curve that corresponds to the measured ride height, which is denoted by the triangle intersecting line C on the target spring curve. Based on the updated target pressure and the measured ride height, the pressure is adjusted in the pneumatic spring (e.g., increased) until the design pressure is approached (or achieved within a bandwidth), and in some instances, the target ride height is approached (or achieved within a bandwidth). In some examples, this may coincide with the point at which the design pressure and the target ride height coincide on the target spring curve, for example, as illustrated by the overlap of the triangle and cross of line A as depicted in FIG. 7.

As shown in FIG. 7, line D depicts an initial pneumatic spring condition in which the initial pressure is greater than the design pressure, and the measured ride height is greater than the target ride height. In some examples, the process may adjust the pressure in the pneumatic spring to reduce the pressure in a manner similar to the process described above with respect to points B, C, and A, only adjusting the pressure downward until the design pressure is approached (or achieved within a bandwidth), and in some instances, the target ride height is approached (or achieved within a bandwidth), for example, as graphically depicted in FIG. 7.

As another example, Point E depicts an initial condition of a pneumatic spring in which the vehicle wheel associated with the pneumatic spring is in a depression or pothole in the surface on which the vehicle wheel is supported. In some such instances, the pressure in the pneumatic spring may be adjusted (e.g., increased) until the design pressure is approached (or achieved within a bandwidth), and in some instances, the target ride height is approached (or achieved within a bandwidth). In some examples, the design pressure and the target ride height may be substantially achieved.

In any of the examples described above with respect to FIG. 7, all pressurizations may be performed in a continuous manner, settling at a final/desired ride height without any oscillations, feedback, or the like.

In various implementations, the parameter values and other data illustrated herein may be included in one or more data stores and may be combined with other information not described or may be partitioned differently into more, fewer, or different data structures. In some implementations, data stores may be physically located in one memory or may be distributed among two or more memories.

Figure 8:
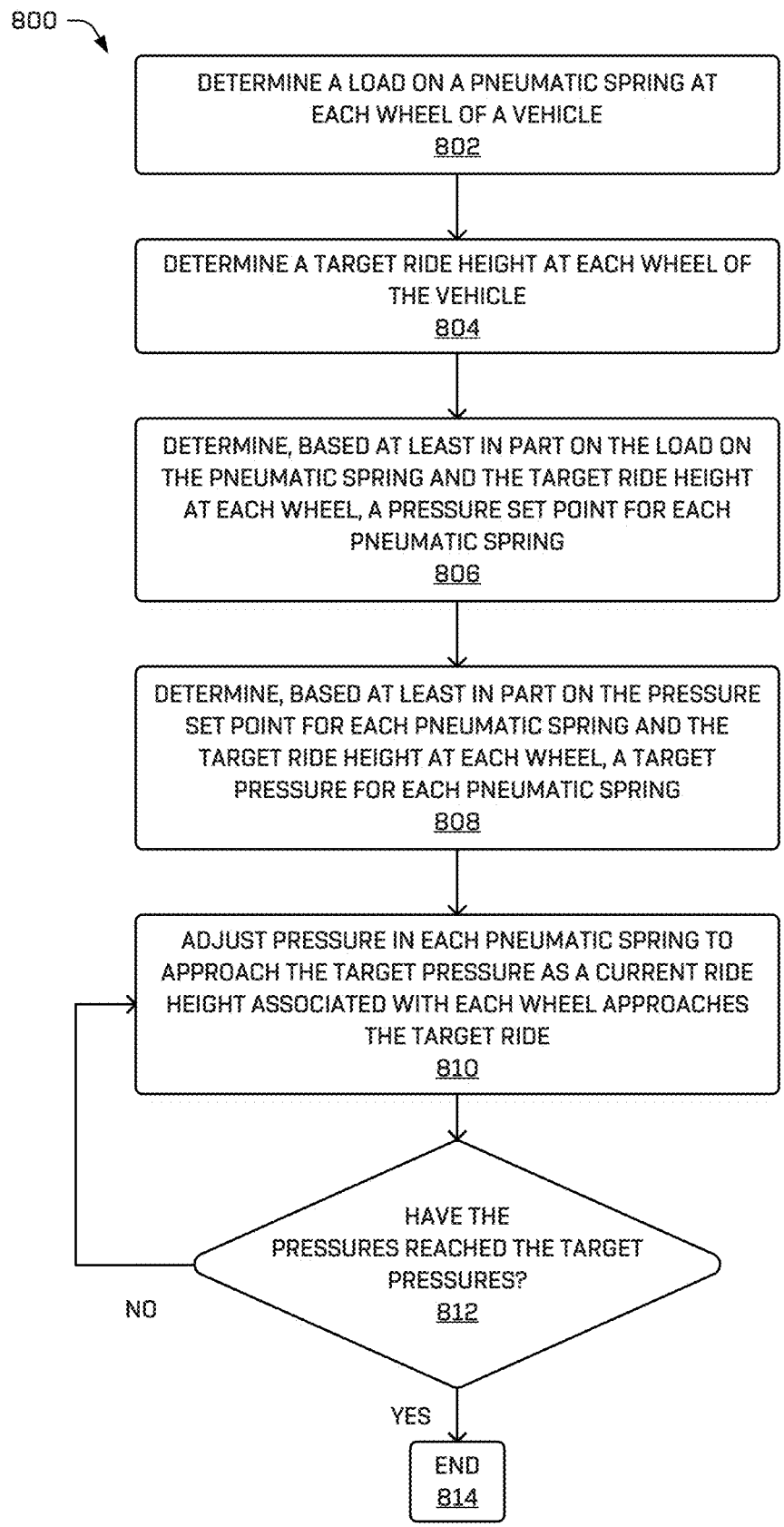
FIG. 8 is a flow diagram of an example process for adjusting a ride height of an example vehicle including pneumatic springs.

FIG. 8 is a flow diagram of an example process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 8 is a flow diagram of an example process 800 for adjusting the ride height RH of a vehicle including pneumatic springs, including adjusting the load at each of the pneumatic springs.

At 802, the example process 800 may include determining a load on a pneumatic spring at each wheel of a vehicle. In some examples, a suspension control system may include a sensor at each wheel configured to generate one or more signals indicative of the load on the respective wheel, and the suspension control system may receive the one or more signals and determine, based at least in part on the one or more signals, the load on the pneumatic spring at each respective wheel. In some examples, the one more sensors may include a pressure sensor in flow communication with the respective pneumatic spring, for example, as described herein with respect to FIGS. 1 and 3. In some examples, the process 800 may include determining a location indicative of a center of gravity of the vehicle. The location indicative of the center of gravity may change depending on, for example, the weight and location of the occupancy of the vehicle by passengers and/or cargo. In some examples, the location indicative of the center of gravity may be determined, for example, based at least in part on the load on each wheel of the vehicle and one or more of the pitch or roll of the vehicle. In some examples, the pitch or roll of the vehicle may be determined as outlined herein, for example, based on one or more signals from one or more accelerometers, one or more inertial measurement units, and/or any one or more of any of the other sensors described herein or otherwise known to provide an orientation of the vehicle.

At 804, the example process 800 may further include determining a target ride height at each wheel of the vehicle. This determination may be based on various factors, for example, such as those described herein.

In some examples of the process 800, at 806, the process 800 may include determining, based at least in part on the load on each pneumatic spring and the target ride height at each wheel of the vehicle, a pressure set point (e.g., a design pressure) for each pneumatic spring. This may be performed, for example, as described herein. In some examples, determining the pressure set point for each pneumatic spring may also be based on the location indicative of the center of gravity. In some examples, this may render it possible to set the load on each of the wheels of the vehicle substantially equal to one another, for example, regardless of the distribution of load in the vehicle. For example, due to an uneven load distribution, one or more of the pneumatic springs may carry relatively more load than one or more of the other pneumatic springs, for example, when a person and/or cargo is positioned in the vehicle, such that there is an uneven load distribution. This may prevent setting the ride height at each of the wheels independent of the load, which may create performance problems if, for example, the load on one or more wheels of the vehicle differs significantly from the loads on one or more of the other wheels. In at least some examples, such a determination may also comprise receiving map data associated with a current position of the vehicle, as well as determining a desired orientation of the vehicle relative to the map data.

At 808, the example process 800 may include determining, based at least in part on the pressure set point for each pneumatic spring and the target ride height at each wheel of the vehicle, a target pressure for each pneumatic spring. In some examples, this may be determined according to one or more of the example procedures described previously herein.

At 810, the example process 800 may further include dynamically adjusting pressure in each pneumatic spring to approach the target pressure and the target ride height at each wheel of the vehicle. In some examples, the levelling controller may cause the pneumatic system to increase and/or release pressure in each of the pneumatic springs to achieve the target pressure and the target ride height at each of the wheels of the vehicle. In some examples, the pressurized air source and a valve in a line between the pressurized air source may be operated to increase and/or release the pressure in the respective pneumatic spring to achieve the target pressure and the target ride height, for example, as described herein.

At 812, the example process 800 may include determining whether the pressure in each of the respective pneumatic springs has reached the respective target pressures. If not, the process 800 may return to 810 to continue to adjust the pressures in each of the pneumatic springs. This may, in some examples, be performed by the levelling controller of the suspension control system, which may receive one or more signals indicative of the pressure in each of the pneumatic springs, for example, as described herein. As described herein with respect to some examples, as the target pressures are reached in each of the pneumatic springs, the target ride heights will be approached. In some examples, continuing to update the target pressure determinations as the target ride heights are approached at each of the wheels may be continued until the target ride heights are reached, for example, within a predetermined bandwidth of the target ride heights.

If at 812, the target pressures have been achieved at each of the wheels of the vehicle, and in some instances, the target ride heights have been approached or reached, the process 800 may end of 814. In some examples, the process 800 may be re-started, for example, when the load in the vehicle changes in position and/or magnitude. For example, if a passenger/cargo in the vehicle moves to a different location inside the vehicle, a passenger exits/cargo is removed from the vehicle, and/or a passenger enters/cargo is placed on the vehicle, the process 800 may be re-started to achieve the target load and ride height at each wheel of the vehicle.

The systems, components, and methods described herein may be implemented using any combination of software or hardware elements. The systems, components, and methods described herein may be implemented using one or more virtual machines operating alone or in combination with one other. Any applicable virtualization solution may be used for encapsulating a physical computing machine platform into a virtual machine that is executed under the control of virtualization software running on a hardware computing platform or host. The virtual machine may have both virtual system hardware and guest operating system software.

The systems and methods described herein may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication, such as a communication network. Examples of communication networks include, for example, a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

It should be appreciated that the subject matter presented herein may be implemented as a computer process, a computer-controlled apparatus, a computing system, or an article of manufacture, such as a computer-readable storage medium. While the subject matter described herein is presented in the general context of program components that execute on one or more computing devices, those skilled in the art will recognize that other implementations may be performed in combination with other types of program components. Generally, program components include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for operating the systems and implementing the processes have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

EXAMPLE CLAUSES

A. An example vehicle comprising:
a chassis;
a first wheel;
a first pneumatic spring coupled to the first wheel and the chassis;
a first sensor configured to generate a first signal indicative of a current first ride height of the vehicle at the first wheel;
a second wheel;
a second pneumatic spring coupled to the second wheel and the chassis;
a second sensor configured to generate a second signal indicative of a current second ride height of the vehicle at the second wheel;
a pneumatic system in flow communication with the first pneumatic spring and the second pneumatic spring; and
a suspension control system configured to:
determine a current first pressure and a current second pressure;
determine a target first ride height and a target second ride height;
determine, based at least in part on the current first pressure, the current second pressure, the target first ride height, and the target second ride height, a first pressure set point for the first pneumatic spring and a second pressure set point for the second pneumatic spring;
determine, based at least in part on the first pressure set point, the current first pressure, and a current first ride height, a first target pressure;
determine, based at least in part on the second pressure set point, the current second pressure, and a second current ride height, a second target pressure;
receive a signal from the first sensor and receive a signal from the second sensor; and
adjust pressure in the first pneumatic spring and the second pneumatic spring to approach the first target pressure and the second target pressure.

B. The vehicle of example A, wherein the suspension control system is configured to:
identify, based at least in part on the current first pressure, the current second pressure, the target first ride height, and the target second ride height, a first spring curve associated with the first pneumatic spring and a second spring curve associated with the second pneumatic spring; and
determine, based at least in part on the first spring curve and the second spring curve, the first target pressure and the second target pressure, respectively.

C. The vehicle of example A or example B, wherein the suspension control system is configured to cease adjusting pressure in the first pneumatic spring and the second pneumatic spring upon the first current pressure and the second current pressure approaching the first target pressure and the second target pressure, respectively.

D. The vehicle of any one of example A through example C, wherein one or more of (1) the first target pressure differs from the first pressure set point or (2) the second target pressure differs from the second pressure set point.

E. The vehicle of any one of example A through example D, wherein the suspension control system is configured to determine the first pressure set point for the first pneumatic spring and the second pressure set point for the second pneumatic spring, based at least in part, on a first spring curve associated with the first pneumatic spring and a second spring curve associated with the second pneumatic spring, respectively, the first spring curve correlating pressure in the first pneumatic spring and a dimension related to ride height associated with the first pneumatic spring, and the second spring curve correlating pressure in the second pneumatic spring and a dimension associated with the second pneumatic spring.

F. An example suspension control system comprising one or more processors configured to:
determine a current pressure associated with a pneumatic spring;
determine a target ride height associated with a dimension of the pneumatic spring;
determine, based at least in part on the current pressure and the target first ride height, a pressure set point for the pneumatic spring;

determine, based at least in part on the pressure set point and the current pressure, a target pressure; and adjust pressure in the pneumatic spring to approach the first target pressure, wherein adjusting the pressure in the pneumatic spring causes a current first ride height to approach the target first ride height.

G. The system of example F, wherein the one or more processors are configured to:

determine a location indicative of a center of gravity of a vehicle; and determine, based in part on the location indicative of the center of gravity of the vehicle, the target pressure.

H. The system of example F or example G, wherein the one or more processors are configured to receive a signal indicative of one or more of a roll or a pitch of the vehicle and determine the location indicative of the center of gravity based at least in part on the signal indicative of the one or more of the roll or pitch of the vehicle.

I. The system of any one of example F through example H, further comprising one or more of an accelerometer or an inertial measurement unit, and wherein the suspension control system is configured to receive a signal from one or more of the accelerometer or the inertial measurement unit and determine the one or more of the roll or pitch of the vehicle.

J. The system of any one of example F through example I, wherein the one or more processors are configured to:

receive map data associated with a current location of a vehicle; and determine, based at least in part on the map data, one or more of the target first ride height or the first target pressure.

K. The system of any one of example F through example J, wherein the one or more processors are configured to:

determine, based at least in part on the current first pressure, a current load distribution of a vehicle;

determine a target load distribution of the vehicle that differs from the current load distribution of the vehicle;

determine, based in part on the target load distribution, the target pressure; and adjust the pressure in the pneumatic spring to approach the target pressure and the target load distribution.

L. The system of any one of example F through example K, wherein the one or more processors are configured to:

determine a change in a current ride height associated with a dimension of the pneumatic spring;

determine, based in part on the change in the current ride height, the target ride height; and adjust the pressure in the pneumatic spring to approach the target pressure such that the current ride height approaches the target ride height.

M. The system of any one of example F through example L, wherein the one or more processors are configured to determine the pressure set point based at least in part on a spring curve of the pneumatic spring, the spring curve correlating pressure in the pneumatic spring and a dimension of the pneumatic spring.

N. An example method for controlling a vehicle ride height, the method comprising:

determining a load on a pneumatic spring at each wheel of a vehicle;

determining a target ride height at each wheel of the vehicle;

determining, based at least in part on the load on the pneumatic spring at each wheel of the vehicle and the target ride height at each wheel of the vehicle, a pressure set point for each pneumatic spring;

determining, based at least in part on the pressure set point for each pneumatic spring and the target ride height at each wheel of the vehicle, a target pressure for each pneumatic spring; and adjusting pressure in each pneumatic spring to approach the target pressure for each pneumatic spring as a current ride height associated with each wheel of the vehicle approaches the target ride height at each wheel of the vehicle.

O. The method of example N, wherein determining the load on the pneumatic spring at each wheel of the vehicle comprises receiving a pressure signal from a pressure sensor in communication with each of the pneumatic springs.

P. The method of example N or example O, further comprising determining a location indicative of a center of gravity of the vehicle, wherein determining the pressure set point for each of the pneumatic springs comprises determining the pressure set point based at least in part on the load on the pneumatic spring at each wheel of the vehicle and the location indicative of the center of gravity of the vehicle.

Q. The method of any one of example N through example P, wherein determining the location indicative of the center of gravity of the vehicle comprises:

determining one or more of a pitch of the vehicle or a roll of the vehicle; and determining the location indicative of the center of gravity of the vehicle based at least in part on the one or more of the load on the pneumatic spring at each wheel of the vehicle, the pitch of the vehicle, or the roll of the vehicle.

R. The method of any one of example N through example Q, wherein determining one or more of the pitch of the vehicle or the roll of the vehicle comprises:

receiving a signal from one or more of an accelerometer or an inertial measurement unit; and determining the one or more of the pitch of the vehicle or the roll of the vehicle based at least in part on the signal received from the one or more of an accelerometer or an inertial measurement unit.

S. The method of any one of example N through example R, wherein determining the pressure set point for each pneumatic spring comprises determining the pressure set point at each pneumatic spring, based at least in part on a spring curve of one or more of the pneumatic springs, wherein the spring curve correlates pressure in the pneumatic spring and a dimension of the pneumatic spring.

T. The method of any one of example N through example S, further comprising:

receiving map data associated with a current location of the vehicle; and determining, based at least in part on the map data, one or more of the target ride heights or the target pressures.

What is claimed is:

1. A vehicle comprising:
a chassis;
a first wheel;
a first pneumatic spring coupled to the first wheel and the chassis;
a second wheel;
a second pneumatic spring coupled to the second wheel and the chassis;
a pneumatic system in flow communication with the first pneumatic spring and the second pneumatic spring; and
a suspension control system configured to:
determine a current first pressure associated with the first pneumatic spring and a current second pressure associated with the second pneumatic spring;

determine, based at least in part on the current first pressure and the current second pressure, a target first ride height associated with the first wheel, a target second ride height associated with the second wheel, a first design pressure for the first pneumatic spring and a second design pressure set point for the second pneumatic spring, the first design pressure comprising a first desired pressure associated with the first pneumatic spring and the second design pressure comprising a second desired pressure for the second wheel;

determine, based at least in part on a first function determined using the first design pressure and evaluated at a current first ride height associated with the first wheel, a first target pressure associated with the first pneumatic spring, the first target pressure being a pressure different from the first design pressure and associated with the first design pressure by the first function;

determine, based at least in part on a second function determined using the second design pressure evaluated at a current second ride height associated with the second wheel, a second target pressure associated with the second pneumatic spring, the second target pressure being a pressure different from the second design pressure and associated with the second design pressure by the second function; and adjust pressure in the first pneumatic spring to approach the first target pressure and adjust pressure in the second pneumatic spring to approach the first target pressure and the second target pressure, wherein adjusting the pressure in the first pneumatic spring causes the first wheel to approach a first target ride height and the adjusting the pressure in the second pneumatic spring causes the second wheel to approach a second target ride height.

2. The vehicle of claim 1, wherein the suspension control system is configured to:
identify, based at least in part on the first design pressure and the target first ride height, a first spring curve associated with the first pneumatic spring;
identify, based at least in part on the second design pressure and the target second ride height, a second spring curve associated with the second pneumatic spring; and
determine, based at least in part on the first spring curve and the second spring curve, the first target pressure and the second target pressure, respectively.

3. The vehicle of claim 1, wherein the suspension control system is configured to cease adjusting pressure in the first pneumatic spring and the second pneumatic spring in response to the first current pressure and the second current pressure reaching a threshold pressure associated with the first target pressure and the second target pressure, respectively.

4. The vehicle of claim 1, wherein one or more of (1) the first target pressure differs from the first design pressure or (2) the second target pressure differs from the second design pressure.

5. The vehicle of claim 1, wherein the suspension control system is configured to determine the first design pressure for the first pneumatic spring and the second design pressure for the second pneumatic spring, based at least in part, on a first spring curve associated with the first pneumatic spring and a second spring curve associated with the second pneumatic spring, respectively, the first spring curve correlating pressure in the first pneumatic spring and a dimension related to ride height associated with the first pneumatic spring, and the second spring curve correlating pressure in the second pneumatic spring and a dimension associated with the second pneumatic spring.

6. A suspension control system comprising one or more processors configured to:
determine a current pressure associated with a pneumatic spring;
determine a target ride height associated with a dimension of the pneumatic spring;
determine, based at least in part on the current pressure and the target ride height, a design pressure for the pneumatic spring;
determine, based at least in part on the design pressure and a current ride height, a target pressure, the target pressure being different from the design pressure; and
adjust pressure in the pneumatic spring to approach the target pressure,
wherein adjusting the pressure in the pneumatic spring causes the current ride height to approach the target ride height.

7. The system of claim 6, wherein the one or more processors are configured to:
determine a location indicative of a center of gravity of a vehicle; and
determine, based in part on the location indicative of the center of gravity of the vehicle, the design pressure.

8. The system of claim 7, wherein the one or more processors are configured to receive a signal indicative of one or more of a roll or a pitch of the vehicle and determine the location indicative of the center of gravity based at least in part on the signal indicative of the one or more of the roll or pitch of the vehicle.

9. The system of claim 8, further comprising one or more of an accelerometer or an inertial measurement unit, and wherein the suspension control system is configured to receive a signal from one or more of the accelerometer or the inertial measurement unit and determine the one or more of the roll or pitch of the vehicle.

10. The system of claim 6, wherein the one or more processors are configured to:
receive map data associated with a current location of a vehicle; and
determine, based at least in part on the map data, one or more of the target ride height or the target pressure.

11. The system of claim 6, wherein the one or more processors are configured to:
determine, based at least in part on the current pressure, a current load distribution of a vehicle;
determine a target load distribution of the vehicle that differs from the current load distribution of the vehicle; and
determine, based in part on the target load distribution, at least one of the design pressure or the target ride height,
wherein the adjusting the pressure in the pneumatic spring causes the current load distribution to approach the target load distribution.

12. The system of claim 6, wherein the one or more processors are configured to:
determine a change in a current ride height associated with a dimension of the pneumatic spring; and
determine, based in part on the change in the current ride height, the target ride height.

13. The system of claim 6, wherein the one or more processors are configured to determine the target pressure based at least in part on a spring curve of the pneumatic spring, the spring curve correlating pressure in the pneumatic spring and a dimension of the pneumatic spring.

14. A method for controlling a vehicle ride height, the method comprising:
   determining a load on a pneumatic spring at each wheel of the vehicle;
   determining a target ride height at each wheel of the vehicle;
   determining, based at least in part on the load on the pneumatic spring at each wheel of the vehicle and the target ride height at each wheel of the vehicle, a design pressure for each pneumatic spring;
   determining, based at least in part on the design pressure for each pneumatic spring and the target ride height at each wheel of the vehicle, a target pressure for each pneumatic spring, the target pressure being different from the design pressure; and
   adjusting pressure in each pneumatic spring to approach the target pressure for each pneumatic spring to cause a current ride height associated with each wheel of the vehicle to approach the target ride height at each wheel of the vehicle.

15. The method of claim 14, wherein determining the load on the pneumatic spring at each wheel of the vehicle comprises receiving a pressure signal from a pressure sensor in communication with each of the pneumatic springs.

16. The method of claim 14, further comprising determining a location indicative of a center of gravity of the vehicle, wherein determining the design pressure for each of the pneumatic springs comprises determining the design pressure based at least in part on the load on the pneumatic spring at each wheel of the vehicle and the location indicative of the center of gravity of the vehicle.

17. The method of claim 16, wherein determining the location indicative of the center of gravity of the vehicle comprises:
   determining one or more of a pitch of the vehicle or a roll of the vehicle; and
   determining the location indicative of the center of gravity of the vehicle based at least in part on the one or more of the load on the pneumatic spring at each wheel of the vehicle, the pitch of the vehicle, or the roll of the vehicle.

18. The method of claim 17, wherein determining one or more of the pitch of the vehicle or the roll of the vehicle comprises:
   receiving a signal from one or more of an accelerometer or an inertial measurement unit; and
   determining the one or more of the pitch of the vehicle or the roll of the vehicle based at least in part on the signal received from the one or more of the accelerometer or the inertial measurement unit.

19. The method of claim 14, wherein determining the target pressure for each pneumatic spring comprises determining the target pressure at each pneumatic spring, based at least in part on a spring curve, wherein the spring curve correlates pressure in the pneumatic spring and a dimension of the pneumatic spring.

20. The method of claim 14, further comprising;
   receiving map data associated with a current location of the vehicle; and
   determining, based at least in part on the map data, one or more of the target ride height or the design pressure.

* * * * *